(12) United States Patent
Kasamatsu

(10) Patent No.: US 9,154,644 B2
(45) Date of Patent: Oct. 6, 2015

(54) IMAGE READING APPARATUS AND IMAGE DATA TRANSMISSION METHOD

(71) Applicant: Daisuke Kasamatsu, Aichi-ken (JP)

(72) Inventor: Daisuke Kasamatsu, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/038,815

(22) Filed: Sep. 27, 2013

(65) Prior Publication Data

US 2014/0092433 A1 Apr. 3, 2014

(30) Foreign Application Priority Data

Sep. 28, 2012 (JP) .................................. 2012-216228

(51) Int. Cl.
H04N 1/00 (2006.01)

(52) U.S. Cl.
CPC ....... *H04N 1/00209* (2013.01); *H04N 1/00225* (2013.01); *H04N 1/00241* (2013.01); *H04N 2201/0081* (2013.01)

(58) Field of Classification Search
None
See application file for complete search history.

(56) References Cited

U.S. PATENT DOCUMENTS

| 7,859,694 B2 * | 12/2010 | Inada | 358/1.15 |
| 8,595,719 B2 * | 11/2013 | Asai | 717/176 |
| 2005/0141026 A1 * | 6/2005 | Fujino | 358/1.15 |
| 2010/0208295 A1 * | 8/2010 | Sato | 358/1.15 |

FOREIGN PATENT DOCUMENTS

JP 2005-192022 A 7/2005

* cited by examiner

*Primary Examiner* — Ashish K Thomas
(74) *Attorney, Agent, or Firm* — Scully, Scott, Murphy & Presser, P.C.

(57) ABSTRACT

An image reading apparatus includes: a reader configured to read an image to create image data representative of the image; a processor; and a memory storing instructions. According to the instructions, the processor receives first operational input for causing the reader to read the image and obtains a registration request transmitted from a first device that is one of at least one information processing device connected to the image reading apparatus through a network. The registration request is for registering the first device as a transmission destination to which the image data is to be transmitted. The processor registers the first device as the transmission destination, based on the obtained registration request. When the image data is created by the reader in response to receipt of the first operational input, the processor transmits the image data crated by the reader, to the registered first device.

10 Claims, 6 Drawing Sheets

<SCAN SEQUENCE WHERE PC COMMANDS SCAN FIRST>

NOTE: "[ ]" INDICATES USER OPERATION (a) SCAN FOR LAN-CONNECTED PC (b) SCAN FOR USB-CONNECTED PC

<SCAN SEQUENCE WHERE SCANNER STARTS SCANNING FIRST>

(a) SCAN FOR LAN-CONNECTED PC

NOTE: "[ ]" INDICATES USER OPERATION (b) SCAN FOR USB-CONNECTED PC

IMAGE READING APPARATUS AND IMAGE DATA TRANSMISSION METHOD

CROSS REFERENCE TO RELATED APPLICATION

The present application claims priority from Japanese Patent Application No. 2012-216228, which was filed on Sep. 28, 2012, the disclosure of which is herein incorporated by reference in its entirety.

BACKGROUND

The present invention relates to an image reading apparatus configured to read an image on a document and a method for transmitting image data created based on the reading.

USB connection and LAN connection are known. The USB connection allows connection between a scanner and an information processing device such as a personal computer (hereinafter referred to as "PC"). The LAN connection allows connection between a scanner and a plurality of PCs and is widely used.

A scanner that can be connected to a plurality of PCs through a LAN is typically configured such that when a user has operated the scanner to scan an image on a document, a list of PCs connected to the LAN are displayed on an LCD (liquid crystal display) of the scanner, allowing the user to designate a PC to which the scan data is to be transmitted (hereinafter may be referred to as "destination PC") among the list of PCs. This configuration allows the user to reliably transmit the scan data to a desired PC.

SUMMARY

To employ the above-described method of designating the destination PC, however, the scanner needs to include a display/input device (as one example of a user interface) having enough information display/input capability to allow the user to select the destination PC among the plurality of PCs. Thus, the above-described method of designating the destination PC cannot be employed to a scanner not including such a user interface.

As described above, in the scanner not including a display device such as an LCD or a scanner including the user interface having not enough information display/input capability (i.e., a low information display/input capability) to employ the above-described method of designating the destination PC, it is difficult to designate the destination PC when scan is performed by the scanner in response to the operation of the user. This problem has to be solved to make the scanner having a low information display/input capability sharable among the plurality of PCs.

This invention has been developed to provide an image reading apparatus connectable to a plurality of information processing devices through a network and configured to easily and reliably designate a device to which image data is to be transmitted, even in a case where the image reading apparatus has a low information display/input capability.

The present invention provides an image reading apparatus including: a reader configured to read an image to create image data representative of the image; a processor; and a memory storing instructions that, when executed by the processor, cause the processor to perform: receiving first operational input for causing the reader to read the image; obtaining a registration request transmitted from a first device that is one of at least one information processing device connected to the image reading apparatus through a network, wherein the registration request is for registering the first device as a transmission destination that is a device to which the image data is to be transmitted; registering the first device as the transmission destination, based on the obtained registration request; when the image data is created by the reader in response to receipt of the first operational input, transmitting the image data created by the reader, to the registered first device.

The present invention also provides an image data transmission method performed by an image reading apparatus, the method including: when having received a request of registration of a transmission destination from a first device that is one of at least one information processing device connected to the image reading apparatus through a network, registering the first device as the transmission destination, wherein the transmission destination is a device to which the image data is to be transmitted; and when having received first operational input for reading of an image, reading the image and transmitting image data representative of the read image to the registered first device.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIG. 5 is a flow chart illustrating an LAN-side data transmission processing at S150 in the scanner-side scan processing in.

DETAILED DESCRIPTION OF THE EMBODIMENT

Figure 1:
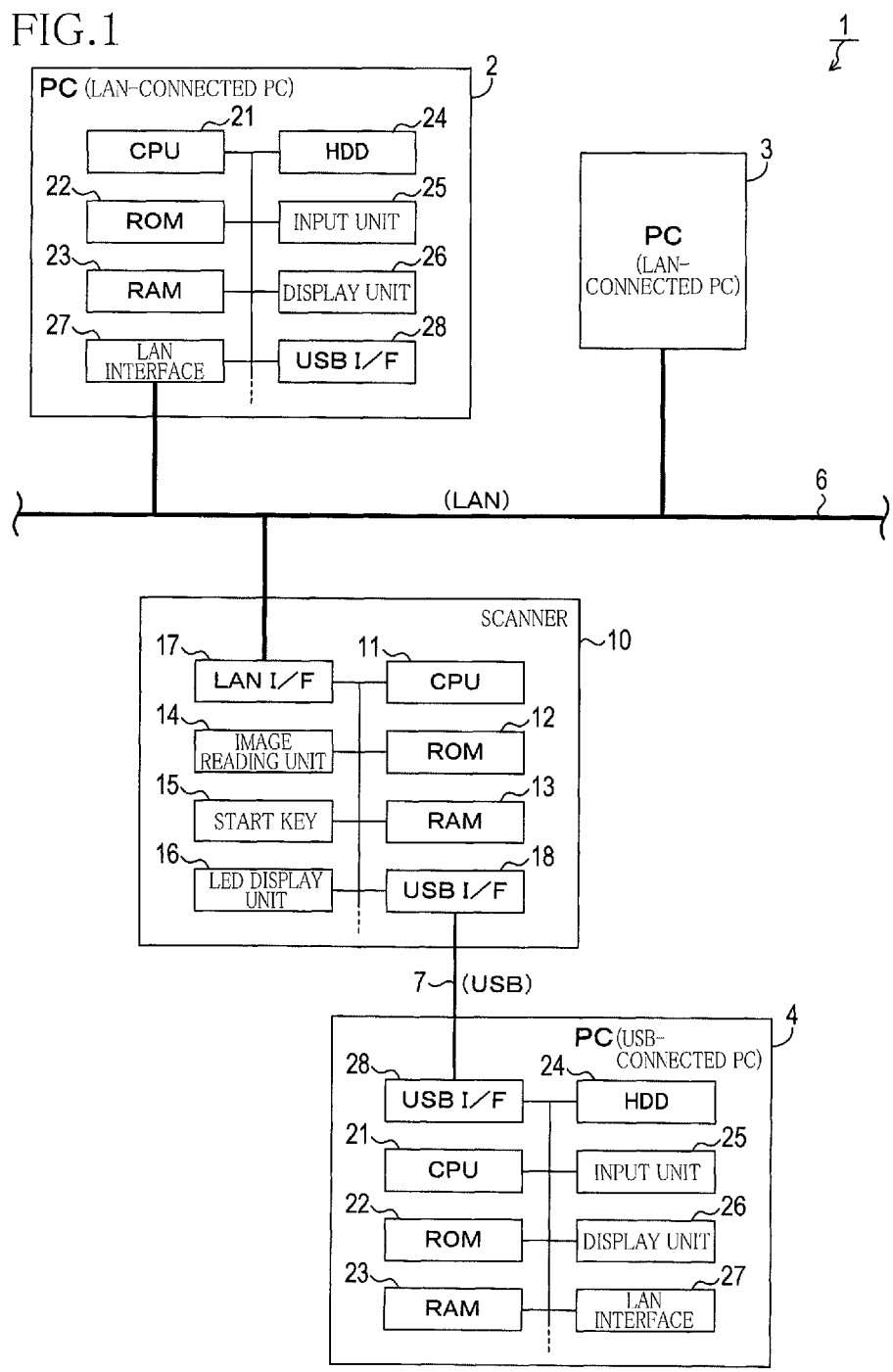
FIG. 1 is a block diagram illustrating a general structure of an information processing system in one embodiment.

Hereinafter, there will be described one embodiment of the present invention by reference to the drawings. As illustrated in FIG. 1, an information processing system 1 according to the present embodiment includes PCs 2, 3, 4 each as one example of an information processing apparatus and a scanner 10 as one example of an image reading apparatus. The PCs 2, 3 and the scanner 10 are connected to each other through a LAN (Local Area Network) 6, allowing data communication therebetween. The PC 4 and the scanner 10 are connected to each other by a USB (Universal Serial Bus) cable 7, allowing data communication therebetween.

In the following explanation, each of the PCs connected to the LAN 6 will be referred to as "LAN-connected PC", and the PC connected to the USB cable 7 will be referred to as "USB-connected PC" in order to distinguish between the two PCs 2, 3 connected to the LAN 6 and the PC 4 connected to the USB cable 7. FIG. 1 illustrates by way of example the two LAN-connected PCs 2, 3 connected to the LAN 6, but the number of the LAN-connected PCs may be one or more than two.

The two LAN-connected PCs 2, 3 and the USB-connected PC 4 are similar in construction to each other. Thus, only one LAN-connected PC 2 will be explained in detail by way of example. The LAN-connected PC 2 has a well-known structure including a CPU (Central Processing Unit) 21, a ROM (Read Only Memory) 22, a RAM (Random Access Memory) 23, a HDD (Hard Disc Drive) 24, an input unit 25, a display unit 26, a LAN interface (LANI/F) 27, and a USB interface (USBI/F) 28.

The input unit 25 includes a key board, a mouse, and a touch panel for a user. The display unit 26 is constituted by a display device such as a liquid crystal display. The HDD 24 is installed with various kinds of software. The software installed includes a scanner application that is software capable of communicating with the scanner 10 to command the scanner 10 to read or scan an image on a document and receiving data representative of the scanned image, namely scan data, from the scanner 10 to process the data.

The scanner application has various functions, one of which is for transmitting a destination registration request when the scanner application commands via the LAN 6 the scanner 10 to perform the scan. The destination registration request requests the scanner 10 to register the LAN-connected PC 2 as a device to which scan data is to be transmitted (hereinafter may be referred to as "transmission destination"). Other functions of the scanner application include a function for setting various setting items used when the scanner 10 performs the scan. The setting items include the number of colors, a resolution, and a document size, for example. Information about these setting items set by this function is transmitted to the scanner 10 upon transmission of the destination registration request, so that the scanner 10 performs the scan using the received set values.

The scanner 10 includes a CPU 11 (as one example of a processor), a ROM 12 (as one example of a memory), a RAM 13, an image reading unit 14, a start key 15, an LED display unit 16, a LAN interface 17, and a USB interface 18.

The CPU 11 controls the components of the scanner 10 and performs various computations according to programs and data stored in the ROM 12. The RAM 13 is used as a main memory that is accessed directly from the CPU 11, for example. The image reading unit 14 is equipped with an image sensor and configured to read an image on a document to create image data representative of the image.

The start key 15 is a small button or switch of a momentary type as one example of a first operational input receiver and a second operational input receiver. This start key 15 is pressed when a user operates the scanner 10 to scan a document. When this start key 15 is pressed, the scan of the document is started, and image data representative of the scanned document is transmitted to a PC.

The user can designate and register a PC to which the obtained image data is to be transmitted. Whether the image data is to be transmitted to the PC connected to the LAN 6 or the PC connected to the USB cable 7 can be designated by a length of time for which the start key 15 is pressed. Specifically, in a case where the start key 15 is pressed for a relatively short time, e.g., a time shorter than three seconds (noted that this pressing may be hereinafter referred to as "short button press" as one example of a second operational input), the USB-connected PC is automatically designated as the transmission destination. On the other hand, in a case where the start key 15 is pressed for a relatively long time, e.g., a time equal to or longer than three seconds (noted that this pressing may be hereinafter referred to as "long button press" as one example of a first operational input), the LAN-connected PC is automatically designated as transmission destination.

In the case where the start key 15 is pressed for a relatively long time, and thereby the LAN-connected PC is designated as the transmission destination, whether the scan data is to be transmitted to the LAN-connected PC 2 or 3 is determined based on the destination registration request. Specifically, the LAN-connected PC that has issued the destination registration request is registered as the transmission destination by the scanner 10 (noted that a LAN-connected PC that has issued any kind of request may be hereinafter referred to as "requestor LAN-connected PC"), the created image data is transmitted to the requestor LAN-connected PC registered as the transmission destination.

The LED display unit 16 in the present embodiment includes one LED and a drive circuit for driving the LED. The LED is controlled so as to illuminate or blink to display and notify various information as will be described below. The scanner 10 in the present embodiment has a simple and small construction for reduced cost. Thus, this scanner 10 does not include any display device (such as an LCD) other than the LED display unit 16 for displaying information for the user.

The LAN interface 17 of the scanner 10 is connected to the LAN 6, while the USB cable 7 is connected to the USB interface 18 of the scanner 10. The two LAN-connected PCs 2, 3 are connected to the LAN 6 by the LAN interface 27, allowing data communication between the two LAN-connected PCs 2, 3 and the scanner 10 through the LAN 6. The USB-connected PC 4 is connected to the USB cable 7 by the USB interface 28, allowing data communication between the USB-connected PC 4 and the scanner 10 through the USB cable 7.

Figure 2:
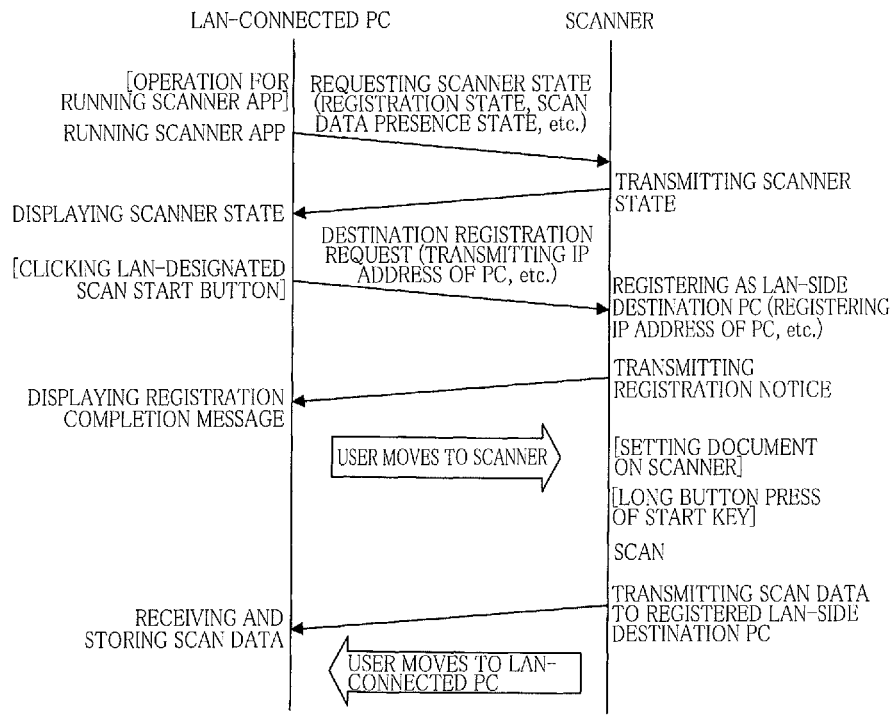
FIG. 2 is a view illustrating a scan sequence in a case where a scan is commanded from a PC side first.
Figure 2:
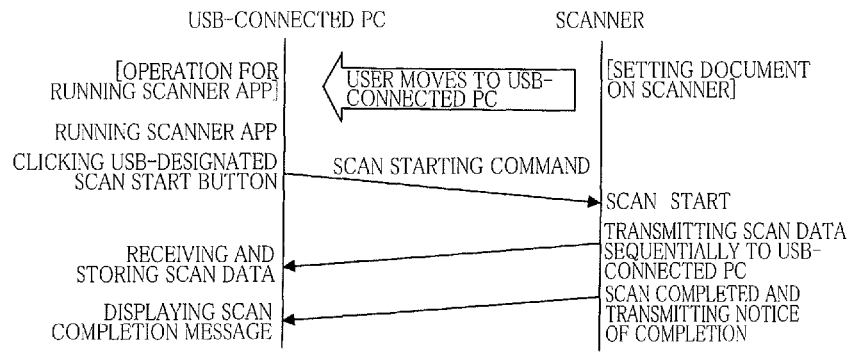
Figure 3:
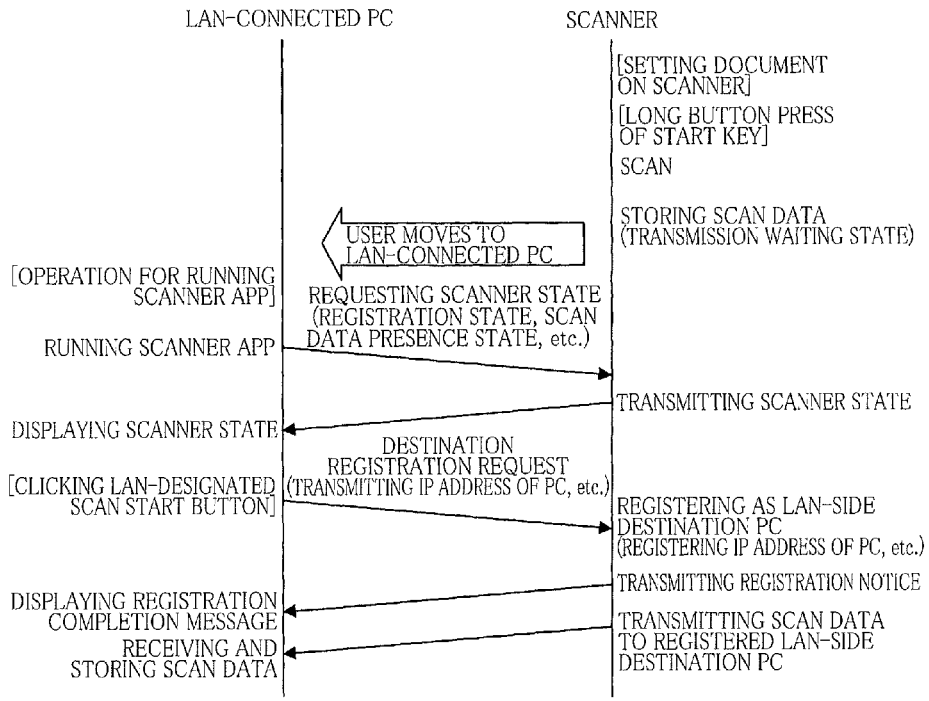
FIG. 3 is a view illustrating a scan sequence in a case where a scan is started by a scanner first.
Figure 3:
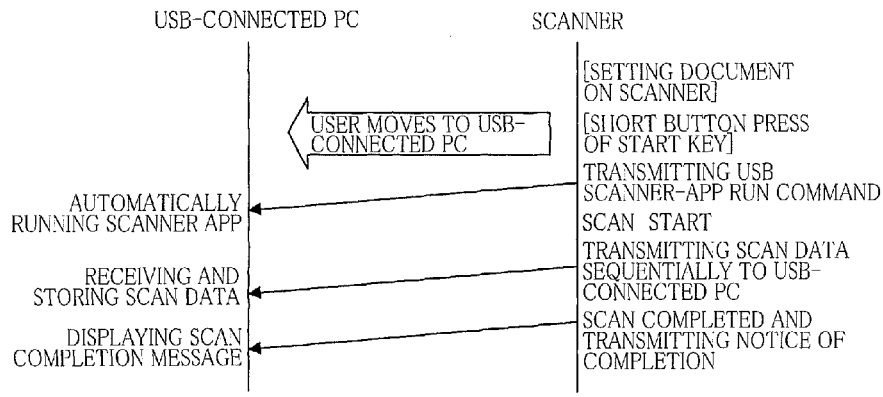

There will be next explained, with reference to FIGS. 2 and 3, examples of operations, i.e., a scan sequence, for causing the scanner 10 to scan a document in the information processing system 1 in the present embodiment. Broadly, a method of causing the scanner 10 to perform the scan includes: a method in which a PC commands the scanner 10 first to scan a document (hereinafter may be referred to as "PC-first method"); and a method in which the start key 15 of the scanner 10 is operated first to cause the scanner 10 to scan a document (hereinafter may be referred to as "scanner-first method"). Operations in each of the PC-first method and the scanner-first method are different depending upon whether the scan data is to be transmitted to the LAN-connected PC or the USB-connected PC.

First, there will be explained, with reference to FIG. 2(*a*), a scan sequence in a case where scan data is transmitted to the LAN-connected PC 2 using the PC-first method. As illustrated in FIG. 2(*a*), the scanner application runs when the user operates the LAN-connected PC 2 to start the scanner application. When the scanner application runs, the LAN-connected PC 2 requests the scanner 10 to transmit information about a state of the scanner 10 (noted that this information is one example of first information and second information). The information about the state of the scanner 10 includes: information about whether any of the LAN-connected PCs has been registered as the transmission destination or not; and information about whether or not a memory (the RAM 13 in this example) stores scan data that is obtained by scan but has not been transmitted yet, for example.

When the information about the state of the scanner 10 is requested by the LAN-connected PC 2, the scanner 10 transmits the requested information. Upon receipt of the information from the scanner 10, the LAN-connected PC 2 displays the received information on the display unit 26. Thus, the user can view the displayed information to recognize various information about the state of the scanner 10 such as information about whether another LAN-connected PC has already been registered as the transmission destination or not and information about whether scan data not transmitted has been stored or not (i.e., information about whether or not the memory contains scan data waiting to be transmitted).

After the receipt and display of the information about the state of the scanner 10, when a LAN-designated scan start button displayed on the display unit 26 is clicked by the user using a mouse, the LAN-connected PC 2 transmits the destination registration request to the scanner 10. Specifically, the destination registration request transmits an IP address or a PC's name of the LAN-connected PC 2 to request the scanner 10 to register the LAN-connected PC 2 as the transmission destination.

Upon receipt of the destination registration request from the LAN-connected PC 2, the scanner 10 registers the LAN-connected PC 2 as a LAN-connected PC to which the data is to be transmitted (hereinafter may be referred to as "LAN-side destination PC"). Specifically, the IP address or the PC's name transmitted as the destination registration request from the LAN-connected PC 2 is registered and stored into, e.g., the RAM 13, as a LAN-side destination to which the data is to be transmitted. Having registered the requestor LAN-connected PC 2 as the LAN-side destination PC, the scanner 10 transmits a registration notice to the registered LAN-side destination PC, i.e., the LAN-connected PC 2. Upon receipt of the registration notice from the scanner 10, the LAN-connected PC 2 displays a registration completion message on the display unit 26. The user of the LAN-connected PC 2 can view the registration completion message to recognize that the LAN-connected PC 2 has been registered as the transmission destination by the scanner 10.

After recognizing the completion of the registration by the registration completion message, the user of the LAN-connected PC 2 moves to a place where the scanner 10 is installed, and performs a series of operations for commanding the scanner 10 to scan a document. Specifically, the user places the document onto the scanner 10 and presses the start key 15 of the scanner 10 for a relatively long time, so that the scanner 10 scans the document. The scan data created by the scan is then transmitted to the registered LAN-side destination PC, i.e., the LAN-connected PC 2.

Upon receipt of the scan data from the scanner 10, the LAN-connected PC 2 stores the scan data into the RAM 23. The user returns to a place where the LAN-connected PC 2 is installed, to perform various operations using the scan data stored in the LAN-connected PC 2, such as printing and image processing.

That is, in the scan sequence illustrated in FIG. 2(a), in response to the destination registration request transmitted from the LAN-connected PC 2, the LAN-side destination PC is registered first, and when the scan is performed by the scanner 10 in response to the long button press of the start key 15, the scan data is transmitted to the registered LAN-side destination PC.

There will be next explained, with reference to FIG. 2(b), a scan sequence in a case where scan data is transmitted to the USB-connected PC 4 using the PC-first method. As illustrated in FIG. 2(b), in a case where the user wants to receive the scan data on the USB-connected PC 4, the user places the document onto the scanner 10, then moves to a place where the USB-connected PC 4 is installed, and operates the USB-connected PC 4 to run the scanner application. After the scanner application runs on the USB-connected PC 4, when the user clicks a USB-designated scan start button displayed on the display unit 26 using a mouse, the USB-connected PC 4 transmits a scan starting command to the scanner 10.

Upon receipt of the scan starting command from the USB-connected PC 4, the scanner 10 starts scanning the document. After the start of the scan, the scanner 10 sequentially transmits created scan data to the USB-connected PC 4. Upon receipt of the scan data from the scanner 10, the USB-connected PC 4 stores the scan data into the RAM 23.

When the scanner 10 has completed the scan of the document and transmitted all the scan data to the USB-connected PC 4, the scanner 10 transmits a notice of completion to the USB-connected PC 4. Upon receipt of the notice of completion from the scanner 10, the USB-connected PC 4 displays a scan completion message on the display unit 26. The user of the USB-connected PC 4 can view the scan completion message to recognize the completion of the scan of the scanner 10 (and accordingly completion of receipt of the scan data by the USB-connected PC 4).

There will be next explained, with reference to FIG. 3(a), a scan sequence in a case where scan data is transmitted to the LAN-connected PC 2 using the scanner-first method. As illustrated in FIG. 3(a), in a case where the scan is performed using the scanner-first method, the user first performs a series of operations for commanding the scanner 10 to scan a document. That is, the user sets the document and presses the start key 15 of the scanner 10 for a relatively long time, so that the scanner 10 scans the document. Since no transmission destination has been registered for scan data created by the scan, the scan data is stored into the memory of the scanner 10. That is, the scanner 10 establishes a transmission waiting state for waiting until the scan data is transmitted.

When the transmission waiting state is established, the user moves to the place where the LAN-connected PC 2 is installed, and operates the LAN-connected PC 2 to run the scanner application. Until the LAN-connected PC 2 receives the registration notice from the scanner 10 after running the scanner application, the same procedure is executed as in the running of the scanner application on the LAN-connected PC 2 in the PC-first method as illustrated in FIG. 2(a). That is, the LAN-connected PC 2 requests the scanner 10 to transmit the information about the state of the scanner 10, and the scanner 10 transmits the information about the state of the scanner 10. Upon receipt of the information from the scanner 10, the LAN-connected PC 2 displays the received information on the display unit 26. When the LAN-designated scan start button is then clicked by the user, the LAN-connected PC 2 transmits the destination registration request to the scanner 10, and the scanner 10 registers the LAN-connected PC 2 as the LAN-side destination PC. After registration, the scanner 10 transmits the registration notice to the LAN-side destination PC, i.e., the LAN-connected PC 2, so that the LAN-connected PC 2 displays the registration completion message.

Following transmission of the registration notice to the LAN-connected PC 2, the scanner 10 transmits the scan data stored in the memory, to the registered LAN-side destination PC, i.e., the LAN-connected PC 2. Upon receipt of the scan data from the scanner 10, the LAN-connected PC 2 stores the scan data into the RAM 23.

That is, in the scan sequence illustrated in FIG. 3(a), the document is scanned first by the scanner 10 in response to the long button press of the start key 15, and then when predetermined operations (e.g., the destination registration request) are performed on the LAN-connected PC 2, the scan data is transmitted to the LAN-connected PC 2.

There will be next explained, with reference to FIG. 3(b), a scan sequence in a case where scan data is transmitted to the USB-connected PC 4 using the scanner-first method. As illustrated in FIG. 3(b), in a case where the user wants to receive the scan data on the USB-connected PC 4 using the scanner-first method, the user places the document onto the scanner 10 and presses the start key 15 of the scanner 10 for a relatively short time, so that a USB scanner-app Run command is transmitted from the scanner 10 to the USB-connected PC 4.

Upon receipt of the scanner-app Run command from the scanner, the USB-connected PC 4 automatically runs the scanner application to prepare for receiving the scan data from the scanner 10. Upon transmission of the scanner-app Run command to the USB-connected PC 4, the scanner 10 starts scanning the document. After the start of the scan, the scanner 10 sequentially transmits created scan data to the USB-connected PC 4. Upon receipt of the scan data from the scanner 10, the USB-connected PC 4 stores the scan data into the RAM 23. When the scanner 10 has completed the scan of the document and transmitted all the scan data to the USB-connected PC 4, the scanner 10 transmits the notice of completion to the USB-connected PC 4. Upon receipt of the notice of completion from the scanner 10, the USB-connected PC 4 displays the scan completion message on the display unit 26.

Figure 4:
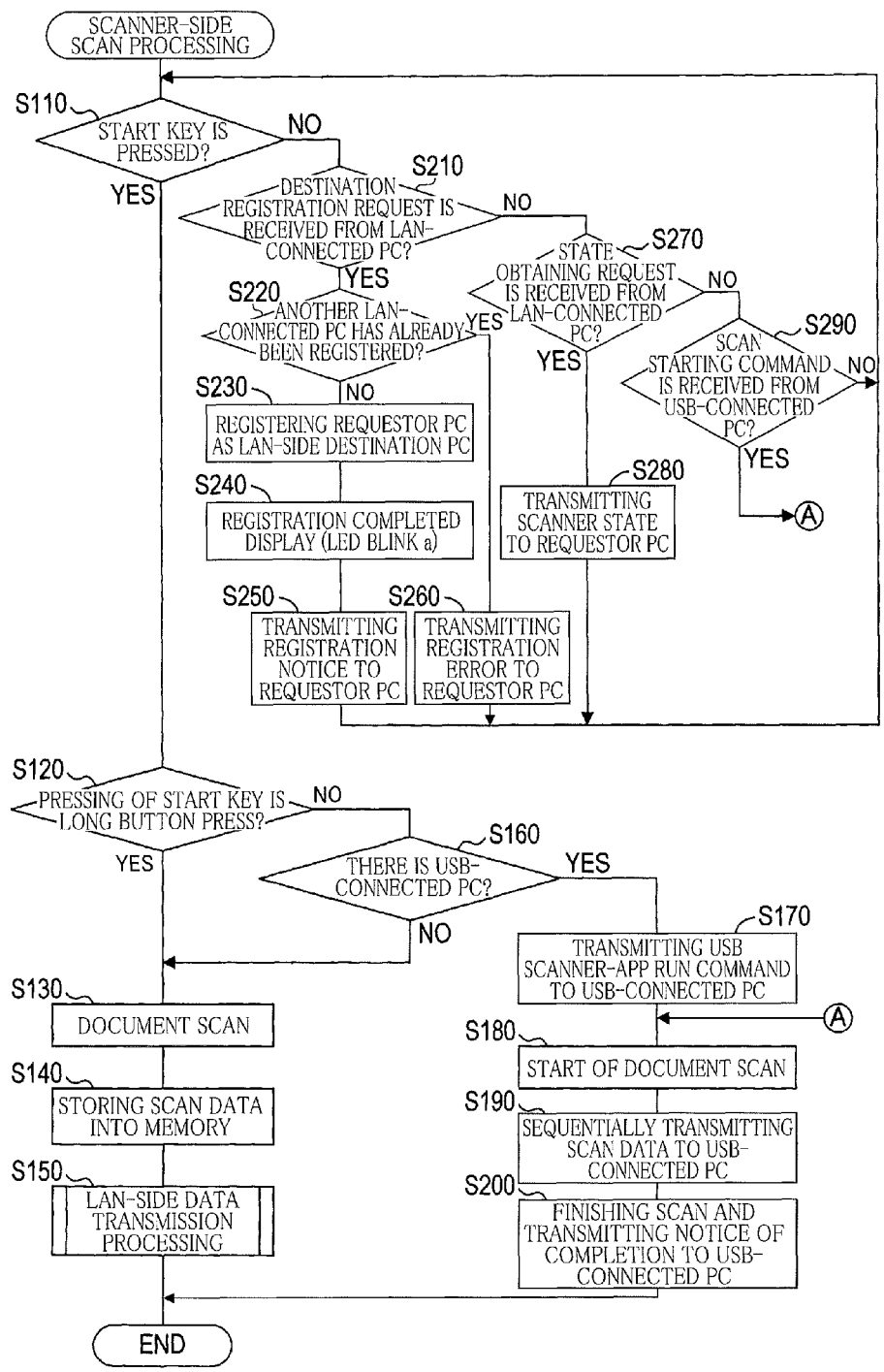
FIG. 4 is a flow chart illustrating a scanner-side scan processing executable by the scanner.
Figure 5:
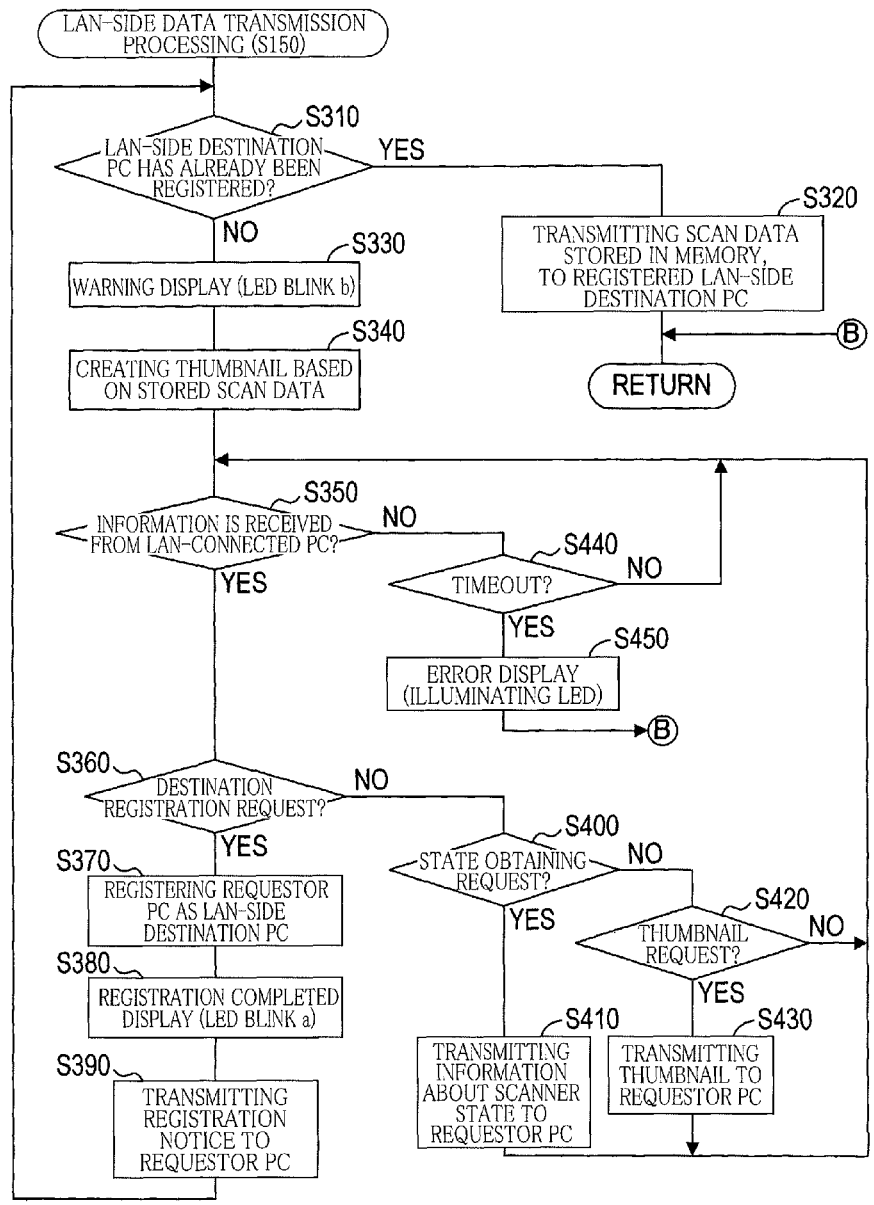
Figure 6:
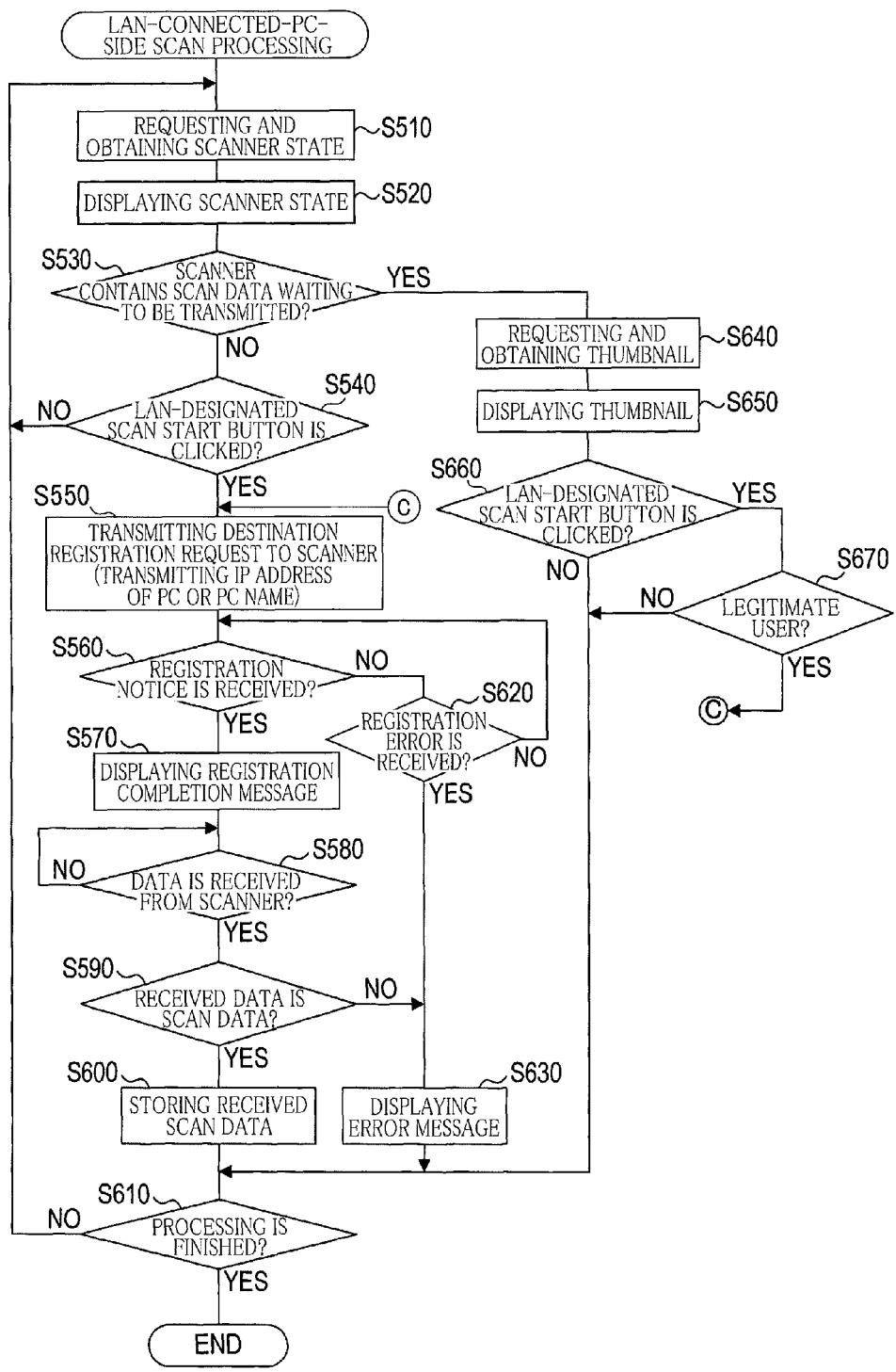
FIG. 6 is a flow chart illustrating an LAN-connected-PC-side scan processing executable by a PC connected to a LAN.

There will be next explained, with reference to FIGS. 4-6, processings that are executed by the scanner 10 and the LAN-connected PC 2 to execute the above-described scan sequences.

There will be first explained, with reference to FIG. 4, a scanner-side scan processing executable by the CPU 11 of the scanner 10. When the scanner 10 is turned on, the CPU 11 reads from the ROM 12 a program of the scanner-side scan processing illustrated in FIG. 4 to execute the scanner-side scan processing. This scanner-side scan processing is repeated at predetermined intervals.

The scanner-side scan processing in FIG. 4 begins with S110 at which the CPU 11 of the scanner 10 determines whether the start key 15 has been pressed or not. When the start key 15 is not pressed, the CPU 11 at S210 determines whether the scanner 10 has received the destination registration request from any of the LAN-connected PCs or not. When the destination registration request is received from any of the LAN-connected PCs, the CPU 11 at S220 determines whether another LAN-connected PC has already been registered as the LAN-side destination PC or not.

When another LAN-connected PC has already been registered, the CPU 11 at S260 transmits a registration error to the LAN-connected PC having issued the destination registration request, and this flow returns to S110. When no LAN-side destination PC has been registered at S220, the CPU 11 at S230 registers the LAN-connected PC having issued the destination registration request as the LAN-side destination PC. Specifically, as described above, the CPU 11 registers the IP address or the PC's name transmitted as the destination registration request.

After the registration of the LAN-side destination PC, the CPU 11 at S240 executes registration completed display. Specifically, the CPU 11 controls the LED of the LED display unit 16 to blink at predetermined time intervals a. Then at S250, the CPU 11 transmits the registration notice to the requestor LAN-connected PC registered as the LAN-side destination PC, and this flow returns to S110.

When the scanner 10 has not received the destination registration request at S210, the CPU 11 at S270 determines whether the LAN-connected PCs has requested the scanner 10 to transmit the state of the scanner 10 or not. It is noted that this request may be hereinafter referred to as "state obtaining request". When the scanner 10 has received the state obtaining request from any of the LAN-connected PCs, the CPU 11 at S280 transmits the information about the state of the scanner 10 to the LAN-connected PC that has issued the state obtaining request, and this flow returns to S110. As described above, the information to be transmitted at S280 includes: the information about whether any of the LAN-connected PCs has already been registered as the LAN-side destination PC or not; and the information about whether or not the memory stores scan data that has not been transmitted yet (i.e., the information about whether or not the memory contains scan data waiting to be transmitted).

When the scanner 10 at S270 has not received the state obtaining request from any of the LAN-connected PCs, the CPU 11 at S290 determines whether the scanner 10 has received the scan starting command from the USB-connected PC or not. When the scan starting command is not received from the USB-connected PC, this flow returns to S110. On the other hand, when the scan starting command is received from the USB-connected PC, this flow goes to S180 at which the scanner 10 starts scanning the document. After the start of the scan (during the scan), the scan data is at S190 sequentially transmitted to the USB-connected PC. At S200, the CPU 11 finishes the scan of the document and transmits the notice of completion to the USB-connected PC, and the scanner-side scan processing ends.

When the start key 15 is pressed at S110, the CPU 11 at S120 determines whether the pressing of the start key 15 is the long button press or not. When the pressing of the start key 15 is not the long button press (that is, when the pressing of the start key 15 is the short button press), the CPU 11 at S160 determines whether or not there is a PC connected to the scanner 10 by the USB cable 7, that is, the CPU 11 determines whether there is a USB-connected PC or not. When there is no USB-connected PC though the short button press is performed on the start key 15, this flow goes from S160 to S130. On the other hand, when there is a USB-connected PC, this flow goes from S160 to S170 at which the CPU 11 transmits the USB scanner-app Run command to the USB-connected PC. This flow then goes to S180 and subsequent steps at which the CPU 11 executes the above-described processings (S180-S200) to scan the document and transmit the scan data to the USB-connected PC, for example, and the scanner-side scan processing ends.

When the pressing of the start key 15 is the long button press at S120, the scanner 10 at S130 scans the document and at S140 stores the scan data into the memory. The CPU 11 at S150 executes a LAN-side data transmission processing. The LAN-side data transmission processing is illustrated in FIG. 5 in detail. The LAN-side data transmission processing begins with S310 at which the CPU 11 determines whether the LAN-side destination PC has already been registered or not.

When the LAN-side destination PC has already been registered, the CPU 11 at S320 transmits the scan data stored in the memory, to the registered LAN-side destination PC. When the scan data is transmitted, the scanner-side scan processing ends.

When the LAN-side destination PC has not been registered yet at S310, the CPU 11 at S330 executes warning display. Specifically, the CPU 11 controls the LED of the LED display unit 16 to blink at predetermined time intervals b. The CPU 11 at S340 creates a thumbnail (as one example of third information) based on the scan data stored in the memory and at S350 determines whether any information has been received from any of the LAN-connected PCs or not.

When no information is received from any of the LAN-connected PCs, the CPU 11 at S440 determines whether a timeout has occurred or not, that is, the CPU 11 determines whether the state in which no information is received from any of the LAN-connected PCs (this state is determined at S350) has continued for a predetermined length of time or not. When the timeout has not occurred, this flow returns to S350. On the other hand, when the timeout has occurred, the CPU 11 at S450 executes error display. Specifically, the CPU 11 controls the LED of the LED display unit 16 to illuminate.

When any information is received from any of the LAN-connected PCs at S350, the CPU 11 at S360 determines whether the received information is the destination registration request or not. When the received information is the destination registration request, the CPU 11 at S370 registers the LAN-connected PC having issued the destination registration request as the LAN-side destination PC. After the registration of the LAN-side destination PC, the CPU 11 at S380 executes the registration completed display (that is, the CPU 11 controls the LED to blink at the time intervals a) as in the processing at S240. The CPU 11 at S390 transmits the registration notice to the LAN-connected PC registered as the LAN-side destination PC, and this flow returns to S310. In the case where this flow returns to S310 after the execution of the processings at S370-S390, the LAN-side destination PC has been registered. Thus, a positive decision is made at S310, and this flow goes to S320 at which the CPU 11 transmits the scan data to the registered LAN-side destination PC.

When the received information is not the destination registration request at S360, the CPU 11 at S400 determines whether the received information is the state obtaining request or not. When the received information is the state obtaining request, the CPU 11 at S410 transmits the information about the state of the scanner 10, to the LAN-connected PC that has issued the state obtaining request, and this flow returns to S350.

When the received information is not the state obtaining request at S400, the CPU 11 at S420 determines whether the received information is a thumbnail request or not. When the received information is not the thumbnail request, this flow returns to S350. On the other hand, when the received information is the thumbnail request, the CPU 11 at S430 transmits the thumbnail created at S340, to the LAN-connected PC having issued the thumbnail request, and this flow returns to S350.

There will be next explained, with reference to FIG. 6, a LAN-connected-PC-side scan processing that is executed by the CPU 21 of the LAN-connected PC 2. When the scanner application runs on the LAN-connected PC 2 (that is, when the CPU 21 executes the scanner application), the CPU 21 searches for a port to which the scanner 10 is connected. When this search shows that the scanner 10 is connected to the LAN interface 27, the LAN-connected-PC-side scan processing illustrated in FIG. 6 is executed. It is noted that this LAN-connected-PC-side scan processing is one of the functions of the scanner application.

This LAN-connected-PC-side scan processing begins with S510 at which the CPU 21 requests and obtains the information about the state of the scanner 10. When the information about the state of the scanner 10 is obtained, the CPU 21 at S520 controls the display unit 26 to display the obtained information about the state of the scanner 10. The information about the state of the scanner 10 allows the CPU 21 to recognize whether the scanner 10 contains scan data waiting to be transmitted (i.e., scan data stored in the memory) or not.

The CPU 21 at S530 determines whether the scanner 10 contains the scan data waiting to be transmitted or not. When the scanner 10 contains the scan data waiting to be transmitted, the CPU 21 at S640 requests and obtains a thumbnail based on the scan data. The CPU 21 at S650 controls the display unit 26 to display the obtained thumbnail. After the display of the thumbnail, the CPU 21 at S660 determines whether the LAN-designated scan start button is clicked by the user or not. When the LAN-designated scan start button is not clicked, this flow goes to S610. On the other hand, when the LAN-designated scan start button is clicked, the CPU 21 at S670 determines whether the user operating the LAN-connected PC 2 is a legitimate user or not.

Specifically, the CPU 21 controls the display unit 26 to display a screen inquiring of the user whether or not the thumbnail displayed at S650 belongs to the user operating the LAN-connected PC 2 (that is, whether or not the thumbnail corresponds to the document scanned by the scanner 10 in response to the command by the user). In a case where the user has operated the screen to indicate that the thumbnail belongs to the user (for example, in a case where the user has clicked a predetermined icon), the CPU 21 considers that the user operating the LAN-connected PC 2 is the legitimate user, and this flow goes to S550 and subsequent steps to obtain the scan data. When the user at S670 has operated the screen to indicate that the thumbnail does not belong to the user, this flow goes to S610 without obtaining the scan data.

When the scanner 10 at S530 does not contain the scan data waiting to be transmitted, the CPU 21 at S540 whether the LAN-designated scan start button has been clicked or not. When the LAN-designated scan start button is not clicked, this flow returns to S510. When the LAN-designated scan start button is clicked, this flow goes to S550.

The CPU 21 at S550 transmits the destination registration request to the scanner 10. That is, as described above, the CPU 21 transmits the IP address or the PC's name of the LAN-connected PC 2 to request the scanner 10 to register the LAN-connected PC 2 as the PC to which the scan data is to be transmitted (i.e., the LAN-side destination PC).

After the destination registration request at S550, the CPU 21 at S560 determines whether the LAN-connected PC 2 has received the registration notice from the scanner 10 or not. When the registration notice is not received, the CPU 21 at S620 determines whether the LAN-connected PC 2 has received the registration error from the scanner 10 or not. When the registration error is not received, this flow returns to S560. On the other hand, when the registration error is received, the CPU 21 at S630 displays a predetermined error message on the display unit 26, and this flow goes to S610.

When the registration notice is received at S560, the CPU 21 at S570 displays the registration completion message on the display unit 26. The CPU 21 at S580 waits for receipt of the data from the scanner 10. When the data is received, the CPU 21 at S590 determines whether the received data is scan data or not. When the received data is not the scan data, the CPU 21 at S630 displays the error message, and this flow goes to S610. On the other hand, when the received data is the scan data, the CPU 21 at S600 stores the received scan data into the RAM 23, and this flow goes to S610. The CPU 21 at S610 determines whether or not the user has performed a predetermined operation for finishing the processing. When the operation for finishing the processing is not performed, this flow returns to S510. On the other hand, when the operation for finishing the processing is performed, the LAN-connected-PC-side scan processing is finished.

In the above-described scanner 10 in the present embodiment, the LAN-connected PC can issue the registration request for requesting the scanner 10 to register the LAN-connected PC as the transmission destination. Thus, even in a case where the scanner 10 has a low information display/input capability, it is possible to reliably designate a desired LAN-connected PC to which the data is to be transmitted, allowing the read scan data to be easily and reliably transmitted to the desired LAN-connected PC.

Also, the scanner 10 in the present embodiment can transmit the scan data to the desired LAN-connected PC in any of a case where the scan is performed after the registration of the LAN-connected PC to which the data is to be transmitted (i.e., the LAN-side destination PC) and a case where the scan is performed before the registration. That is, in the case where the LAN-side destination PC has already been registered before the scan, the scan data is transmitted to the registered LAN-side destination PC after the scan. In contrast, in the case where the document is scanned before the registration of the LAN-side destination PC, the scan data is temporarily stored into the memory, and when a registration request is thereafter received from any of the LAN-connected PCs, the requestor LAN-connected PC is registered as the LAN-side destination PC, so that the scan data is transmitted to the requestor LAN-connected PC. This makes it possible to enhance convenience and usability of the user.

In the present embodiment, the LAN-connected PC can obtain various information about the state of the scanner 10 such as the information about whether the LAN-side destination PC has already been registered by the scanner 10 or not, the information about whether the scan data is stored in the scanner 10 or not (that is, whether the scan data waits to be transmitted or not), and information about contents of the scan data in the case where the scan data is stored. Thus, the LAN-connected PC used by the user can take appropriate action, for example, in the case where another LAN-connected PC has already been registered as the transmission destination, the LAN-connected PC used by the user waits for a while, and in the case where no LAN-connected PC has already been registered, the LAN-connected PC requests the scanner 10 to transmit the scan data to the LAN-connected PC. Also, the LAN-connected PC used by the user can take appropriate action, for example, in the case where no image data is stored, the LAN-connected PC used by the user can determine that the scanner is not used, and transmit the destination registration request. Therefore, the convenience and usability of the user can be enhanced more.

In the present embodiment, the scanner 10 can transmit the scan data selectively to one of the PC connected to the scanner through the LAN and the PC connected to the scanner 10 by the USB. That is, the short button press on the start key 15 causes the scanner 10 to transmit the scan data to the PC connected to the scanner 10 by the USB, while the long button press on the start key 15 causes the scanner 10 to transmit the scan data to the PC connected to the scanner through the LAN. Thus, the scan data can be transmitted to the desired PC easily without erroneous transmission.

In the present embodiment, the scanner 10 executes the registration completed display when the LAN-side destination PC is registered. In other words, when a PC connected to the scanner through the LAN is registered as the transmission destination, this fact is notified on the scanner 10. This notification allows the user to know whether another user is using the scanner 10 or not (that is, whether another user is going to perform an image reading operation or not). Thus, it is possible to prevent erroneous operation and transmission, for example, it is possible to prevent the following case: though another PC connected to the scanner through the LAN has already been registered as the transmission destination, the user operates the scanner 10 to read an image on the document without knowing that, so that image data obtained is transmitted to said another PC connected to the scanner through the LAN.

<Modifications>

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, in the above-described embodiment, whether the scan data is to be transmitted to the LAN-connected PC or the USB-connected PC can be distinguished by the long button press and the short button press on the start key 15, but the PC to which the scan data is to be transmitted may be distinguished in other methods. For example, two start keys may be used.

In the above-described embodiment, the PC can request the scanner 10 to transmit the thumbnail based on the scan data to allow the user using the PC to check the scan data stored in the scanner 10. Instead of the thumbnail, however, any information may be used as long as the information allows the user to directly or indirectly check contents of the scan data. Examples of the information include a data amount of the scan data, the number of pages, and data representative of date and time of the scan.

In the above-described embodiment, one example of the display of the scanner 10 is the LED display unit 16 provided with one LED, but other devices may be used as the display. Other examples of the display include a device provided with a plurality of LEDs of the same color or different colors and configured to combine the "ON", "OFF", and blink of these LEDs to execute the above-described displays and notifications such as the registration completed display (S240), the warning display (S330), and the error display (S470). Also, the scanner 10 may include any display other than the LED.

In the above-described embodiment, the LAN 6 is used as a network for connecting the scanner 10 and the plurality of PCs to each other, and the USB (the USB cable 7) is used as a communication interface for connecting the scanner 10 and one PC to each other, but each of the LAN 6 and the USB (the USB cable 7) is merely an example. Also, both of a wired connection and a wireless communication may be used.

What is claimed is:

1. An image reading apparatus comprising:
a reader configured to read an image to create image data representative of the image;
a processor; and
a memory storing instructions that, when executed by the processor, cause the processor to perform:
receiving a first reading request for causing the reader to read the image;
transmitting first information to a first device that is one of a plurality of information processing devices each connected to the image reading apparatus through a network, the first information indicating whether a second device, which is any one of the plurality of information processing devices other than the first device, has been registered in the image reading device;
receiving a registration request transmitted from the first device through the network after transmitting the first information;
registering, in response to receipt of the registration request, the first device as an only one registered transmission destination of the image data read by the reader when the second device has not been registered in the image reading apparatus; and
transmitting the image data read by the reader to the registered first device after receiving the first reading request.

2. The image reading apparatus according to claim 1,
wherein when executed by the processor, the instructions cause the processor to receive a second reading request that differs from the first reading request for causing the reader to read the image,
wherein an information processing device is connected to the image reading apparatus through a communication interface that differs from the network,
wherein the reader is configured to read the image to create the image data representative of the image not only when the first reading request is received but also when the second reading request is received, and
wherein when executed by the processor, the instructions cause the processor to, when the image data is created by the reader in response to receipt of the second reading request, transmit the image data created by the reader, to the information processing device connected to the image reading apparatus through the communication interface that differs from the network.

3. The image reading apparatus according to claim 1, further comprising an image data storage configured to, when the image data is created by the reader in response to the receipt of the first reading request, store the image data created by the reader,
wherein when executed by the processor, the instructions cause the processor to, when the second device has not been registered as the transmission destination in a state in which the image data is stored in the image data storage, transmit the image data stored in the image data storage, to the first device after the first device is registered as the transmission destination.

4. The image reading apparatus according to claim 2, further comprising a specific button that is used for both of the first reading request and the second reading request.

5. The image reading apparatus according to claim 4, further comprising an image data storage configured to, when the image data is created by the reader in response to the receipt of the first reading request, store the image data created by the reader,
wherein when executed by the processor, the instructions cause the processor to transmit the image data stored in the image data storage, to the first device when the first device has been registered as the transmission destination in a state in which the image data is stored in the image data storage.

6. The image reading apparatus according to claim 3, wherein when executed by the processor, the instructions cause the processor to transmit, to the first device, at least one of (i) second information indicating whether image data is stored in the image data storage and (ii) third information that identifies the image data when the image data is stored in the image data storage.

7. The image reading apparatus according to claim 6, wherein when executed by the processor, the instructions cause the processor to transmit the third information to the first device when the first device has requested the image reading apparatus to transmit the third information.

8. The image reading apparatus according to claim 1, further comprising an indicator configured to indicate that the first device is registered, when the first device is registered as the transmission destination.

9. An image data transmission method performed by an image reading apparatus, the method comprising:
transmitting first information to a first device that is one of a plurality of information processing devices each connected to the image reading apparatus through a network, the first information indicating whether a second device, which is any one of the plurality of information processing devices other than the first device, has been registered in the image reading device;
receiving a registration request transmitted from the first device through the network after transmitting the first information;
registering, in response to receipt of the registration request, the first device as an only one registered transmission destination of the image data read by the reader when the second device has not been registered in the image reading apparatus; and
transmitting image data representative of the read image to the registered first device after receiving a first reading request for reading the image.

10. An image reading apparatus comprising:
a reader configured to read an image to create image data representative of the image;
a processor; and
a memory storing instructions that, when executed by the processor, cause the processor to perform:
receiving a first reading request for causing the reader to read the image;
storing the image data read by the reader to an image data storage;
transmitting first information to a first device that is one of a plurality of information processing devices each connected to the image reading apparatus through a network after storing the read image data, the first information indicating whether a second device, which is any one of the plurality of information processing devices other than the first device, has been registered in the image reading device;
receiving a registration request transmitted from the first device through the network after transmitting the first information;
registering, in response to receipt of the registration request, the first device as an only one registered transmission destination of the image data read by the reader when the second device has not been registered in the image reading apparatus; and
transmitting the image data stored in the image data storage to the registered first device.

* * * * *